June 19, 1951

A. E. SIMON 2,557,477

CATTLE STOCK

Filed July 23, 1948

Inventor

Archie E. Simon

By Clarence A. O'Brien
and Harvey B. Jacobson
Attorneys

June 19, 1951 A. E. SIMON 2,557,477
CATTLE STOCK

Filed July 23, 1948 5 Sheets-Sheet 2

Inventor

Archie E. Simon

By *Clarence A. O'Brien and Harvey B. Jacobson*
Attorneys

June 19, 1951  A. E. SIMON  2,557,477
CATTLE STOCK

Filed July 23, 1948  5 Sheets-Sheet 3

Inventor

Archie E. Simon

By Clarence A. O'Brien
and Harvey B. Jacobson
Attorneys

June 19, 1951        A. E. SIMON        2,557,477
CATTLE STOCK
Filed July 23, 1948        5 Sheets-Sheet 4
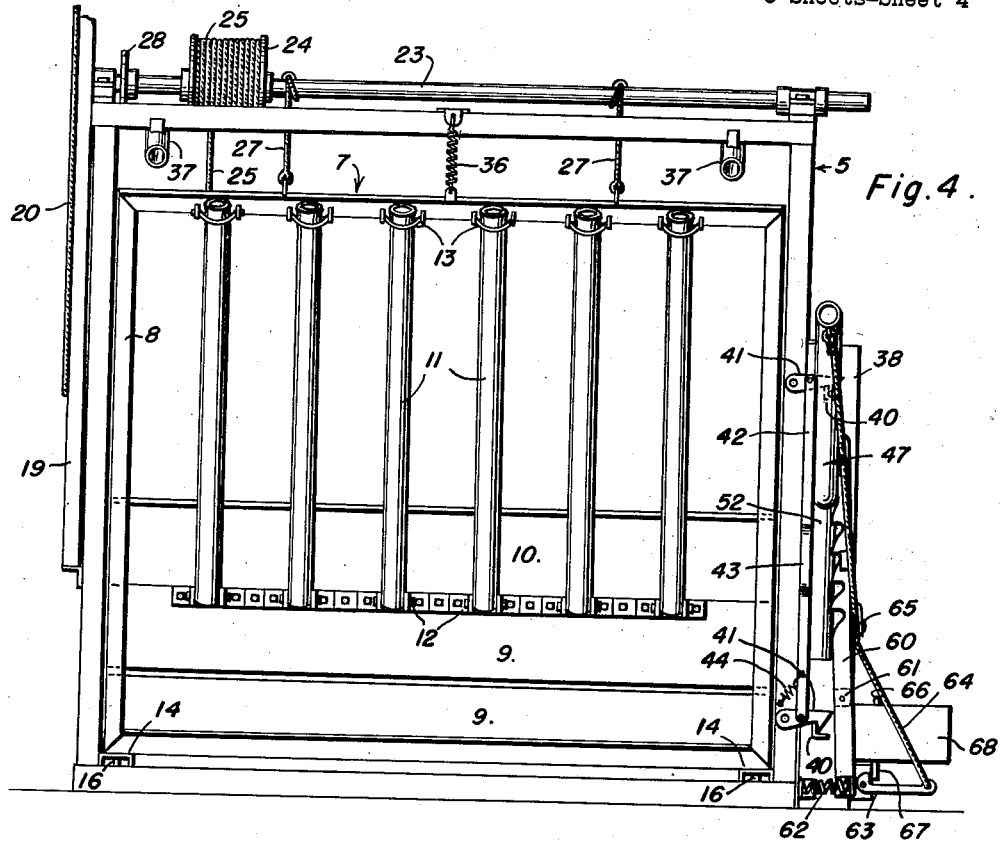
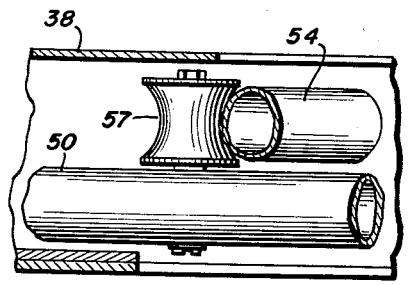
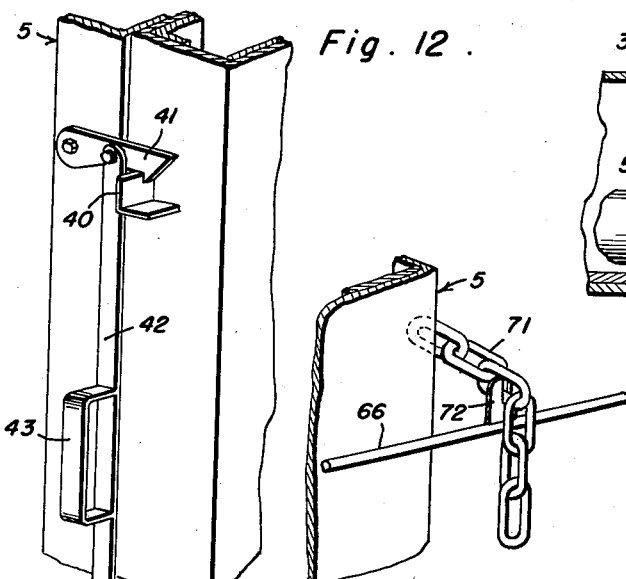
Inventor
Archie E. Simon
By *Clarence A. O'Brien and Harvey B. Jacobson*
Attorneys June 19, 1951  A. E. SIMON  2,557,477
CATTLE STOCK
Filed July 23, 1948  5 Sheets-Sheet 5
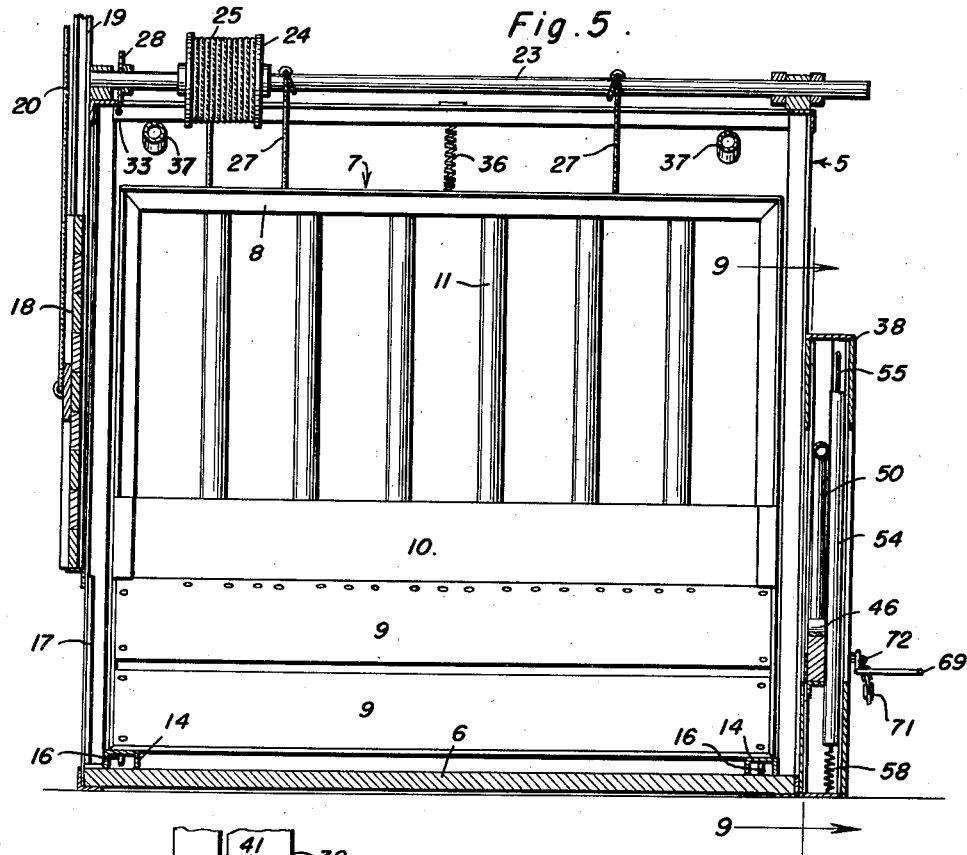
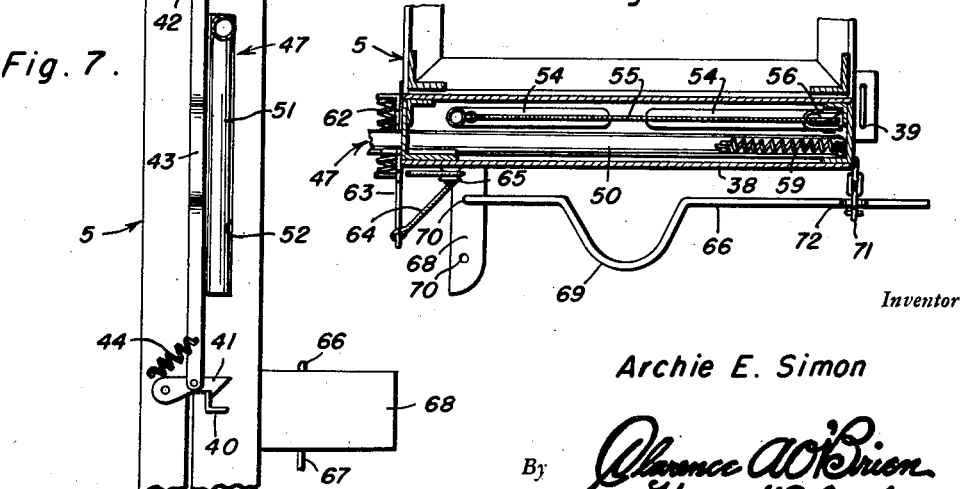
Inventor
Archie E. Simon
By Clarence A. O'Brien
and Harvey B. Jacobson
Attorneys Patented June 19, 1951

2,557,477

UNITED STATES PATENT OFFICE 2,557,477

CATTLE STOCK

Archie E. Simon, Jefferson City, Mont.

Application July 23, 1948, Serial No. 40,319

1 Claim. (Cl. 119—98)

This invention relates to a stock for holding cattle while performing branding, dehorning and other operations on them.

An object of the invention is to provide a stock of the above kind including hinged side clamping side walls of novel construction adapted to be swung toward each other to holding position and to be latched in such holding position with the body of the animal clamped or squeezed therebetween, each side wall including an open frame whose major upper portion is provided with vertical bars releasably held in position across the frame and hinged to be selectively swung outwardly and downwardly to an out-of-the-way position to permit unobstructed access to any desired part of the animal's body.

Another object is to provide simple and efficient means to swing the side walls toward each other to holding position, and to latch them in such holding position.

A further object is to provide a hollow horizontally swingable gate at the front of the stock, which gate has a neck opening provided with a bottom neck rest, in combination with a hand lever hinged within the gate for forcing the animal's neck into and holding it in the neck rest, a pair of levers mounted within the gate to swing toward each other for clamping the animal's neck therebetween, means operatively connecting the hand lever to one lever of said pair and the pair of levers to each other to swing the latter to clamping position when said hand lever is operated to force the animal's neck into the neck rest, and means coacting with said hand lever to latch all of said levers in clamping position.

Other objects and features of the invention will become apparent from the following description when considered in connection with the accompanying drawings, in which:

Figure 4 is a side elevational view thereof looking to the right of Figure 3;

Figure 5 is a vertical longitudinal section taken on the line 5—5 of Figure 1;

Figure 6 is a fragmentary horizontal section taken on the line 6—6 of Figure 3;

Figure 7 is a fragmentary side elevation showing the means for latching the front gate in closed position;

Figure 10 is an enlarged fragmentary horizontal section through the front gate, taken on the line 10—10 of Figure 3;

Figures 12 and 13 are fragmentary detail perspective views showing the latching means for the front gate and for the nose bar, respectively.

Figure 1:
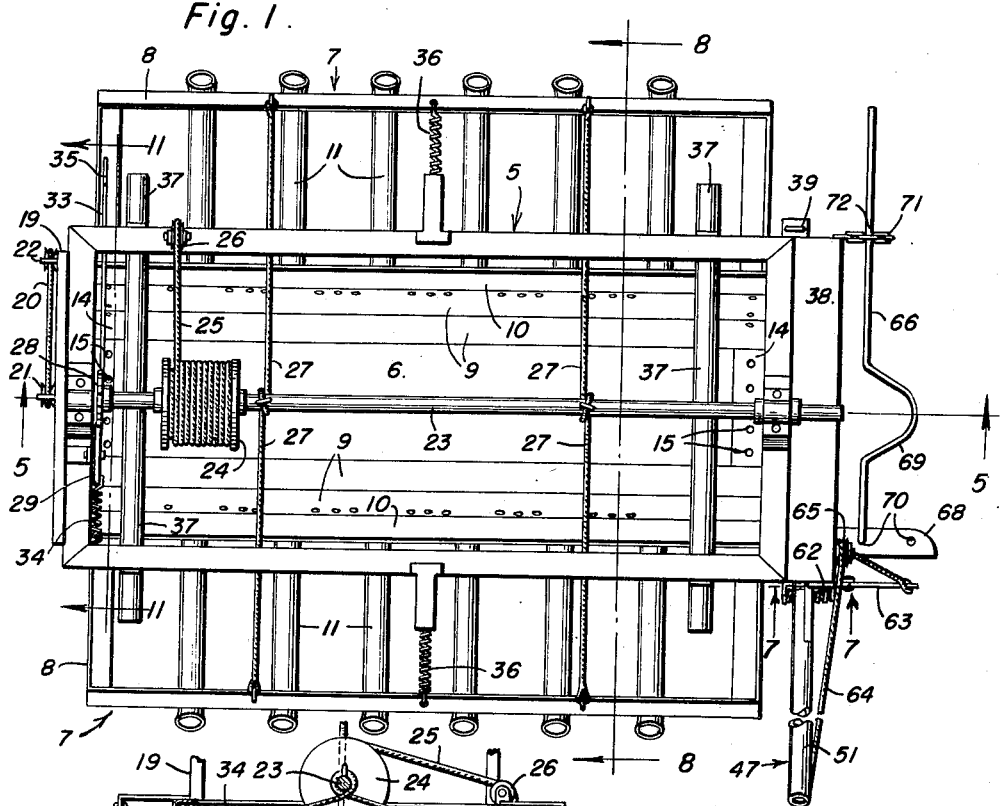
Figure 1 is a top plan view of a cattle stock constructed in accordance with the present invention.
Figure 8:
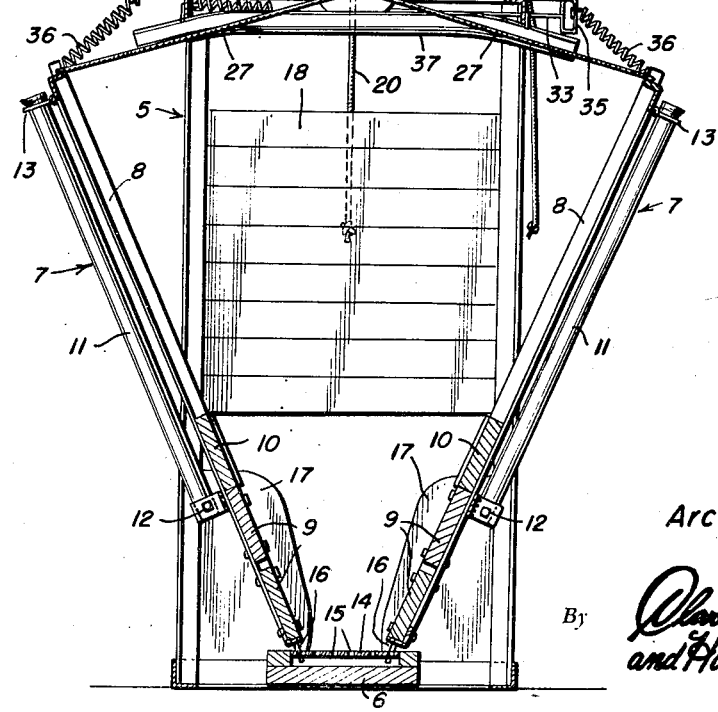
Figure 8 is a transverse vertical section taken on the line 8—8 of Figure 1.
Figure 2:
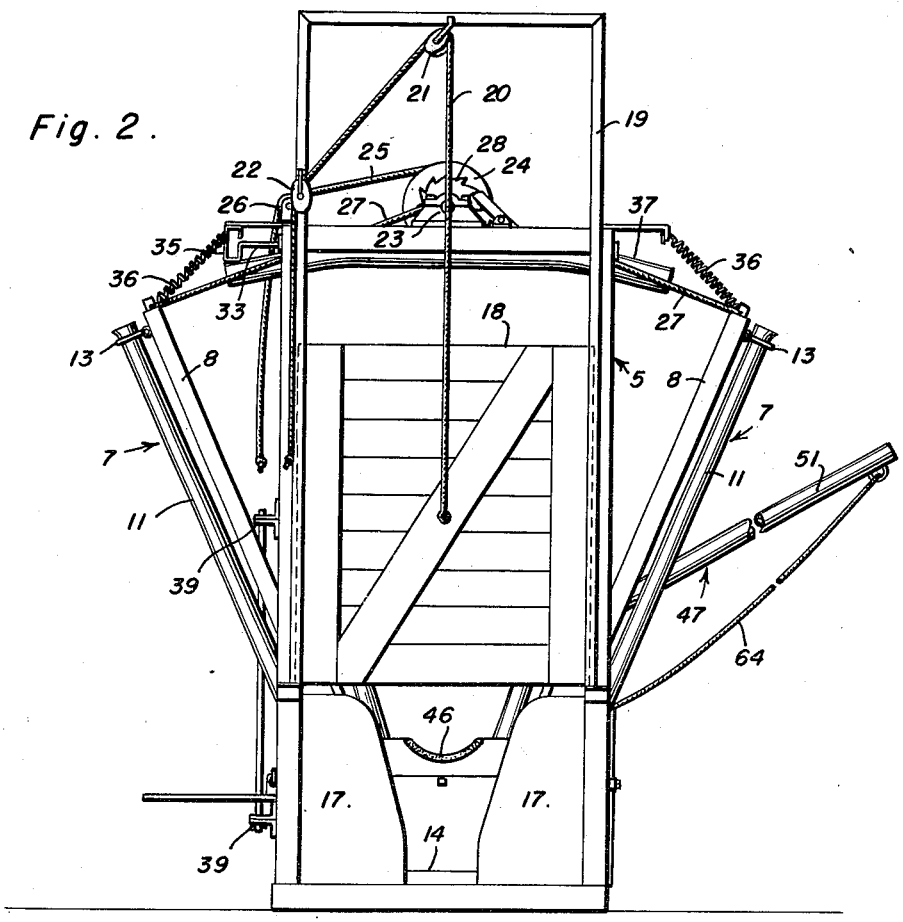
Figure 2 is a rear elevational view thereof.
Figure 11:
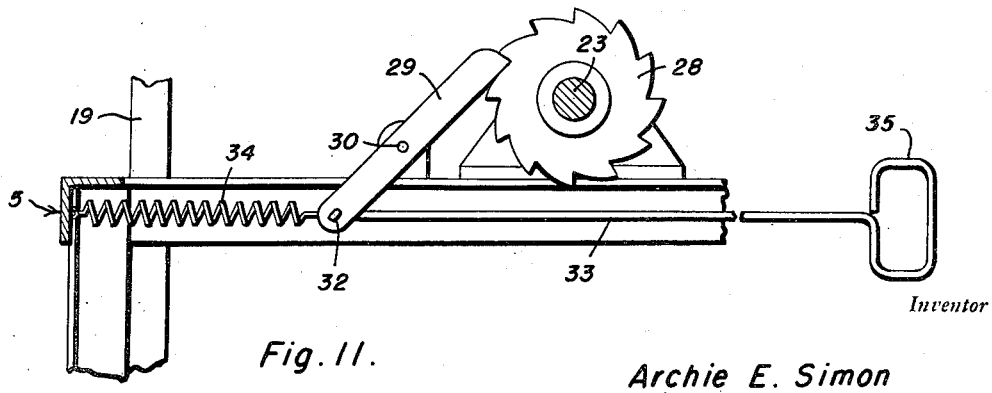
Figure 11 is an enlarged fragmentary vertical section taken on the line 11—11 of Figure 1.
Figure 3:
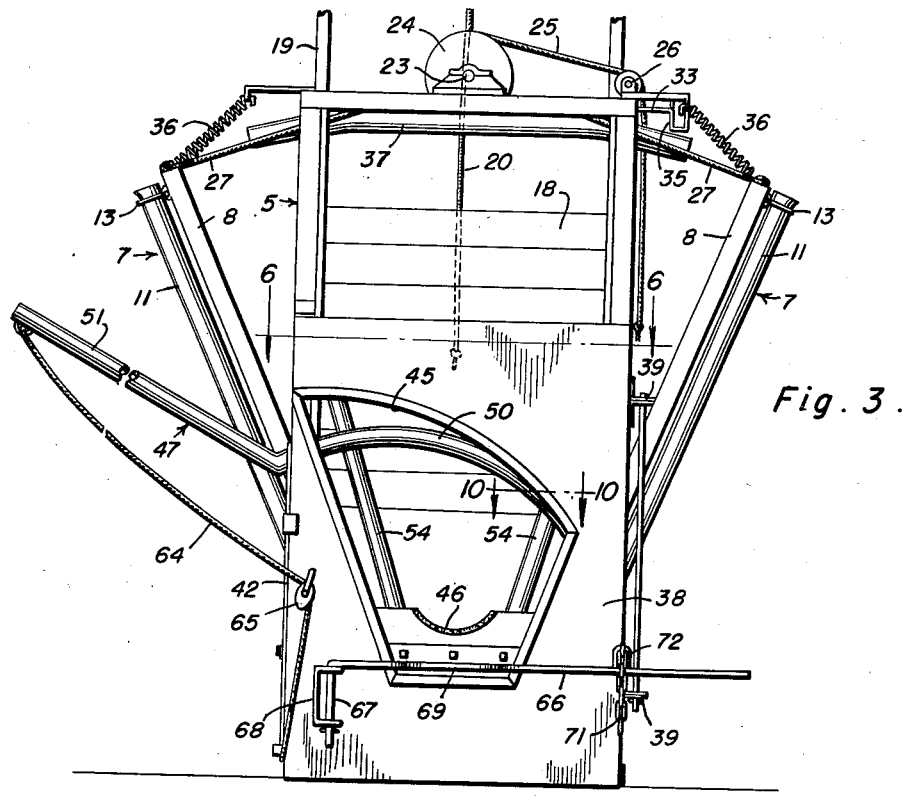
Figure 3 is a front elevational view of the same.
Figure 9:
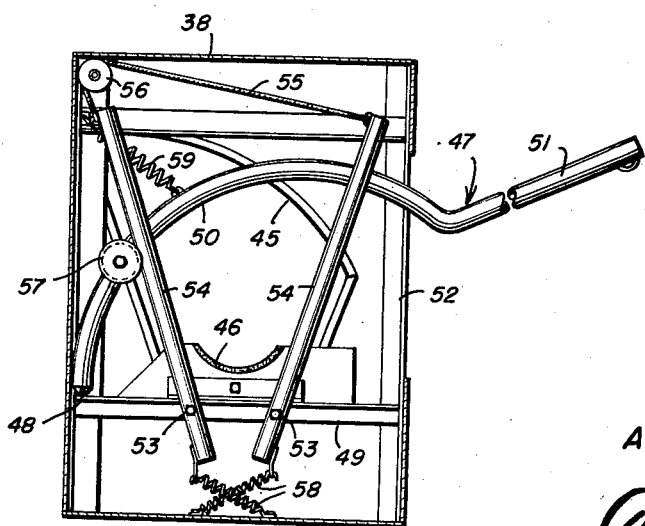
Figure 9 is a vertical section through the front gate taken on the line 9—9 of Figure 5.

Referring in detail to the drawings, 5 indicates an elongated rigid rectangular crate or main skeleton frame having a central longitudinal floor 6 secured in the bottom thereof. The side clamping walls 7 are hingedly mounted on the floor 6 and extend in upwardly diverging relation through the sides of the crate or frame 5. Each wall 7 includes a rectangular frame 8 whose lower portion is closed by fixed lower panels 9 and a removable upper panel 10. A series of spaced vertical bars 11 extend across the upper portion of frame 8, and these bars are hinged at their lower ends on the outside of the upper fixed panel 9 as at 12, to swing outwardly and downwardly to an out-of-the-way position. Hinged bails 13 are carried by the frame 8 and are adapted to engage over the upper ends of the bars 11 to releasably hold them in their upwardly and inwardly swung operative position. Cross bars 14 fixed upon the ends of floor 6 are provided with a series of openings 15 for selective loose reception of pins 16 carried by the bottom member of the frame 8 of each wall 7 to hingedly mount said wall and to provide for adjustment thereof transversely of the crate or frame 5 according to the size of the animal to be held in the stock.

The lower portion of the rear end of the crate or main frame 5 is partially closed by side panels 17, and the upper portion thereof is closed by a vertically slidable gravity closed door 18 mounted in a guide frame 19. A pull cord or cable 20 is attached to the door 18 for use in raising the latter to open position, said pull cord or cable extending upwardly over a pulley 21 at the top of guide frame 19 and over a pulley 22 at one side of the crate 5 where the cord or cable is readily accessible.

Journaled on the top of crate 5, midway between its sides, is a longitudinal shaft 23 having a drum 24 fixed thereon near the rear end of said crate. A cord or cable 25 is attached to and partially wound on drum 24, and the free end portion of this cord or cable is extended laterally over a pulley 26 on top and at one side of crate 5 where said cable may be readily grasped and pulled to unwind it from drum 24 and thereby turn the shaft 23. Other cords or cables 27 are attached at corresponding ends to shaft 23 and at their other ends to the tops of the frames 8 of walls 7, whereby said cords or cables 27 will be wound on shaft 23 to swing the walls 7 toward each other when cord or cable 25 is pulled to turn said shaft 23. Shaft 23 carries a ratchet wheel 28 which is normally engaged by one end of a pawl 29 pivoted between its ends as at 30 to a bracket 31 secured on crate 5. The other end of pawl 29 is pivoted at 32 to a pull rod 33, one end of which is attached to a tension spring 34 to swing the pawl to engaged position. The other end of pull rod 33 extends beyond a side of crate 5 and has a hand grip 35. When the walls 7 have been swung into clamping position against the sides of the body of an animal, pawl 29 engages ratchet wheel 28 to prevent retrograde rotation of shaft 23 and thereby hold said walls 7 in clamping position. When rod 33 is pulled to release pawl 29, walls 7 will swing apart by gravity to release the animal, at which time the cords or cables 27 will unwind from shaft 23 and cord or cable 25 will wind onto drum 24. The separation of walls 7 is yieldingly limited by tension springs 36 connecting the top or crate 5 to the tops of frames 8. Transverse guard bars 37 are provided across the top of crate 5 near the ends of the latter.

At its front end, the crate 5 is closed by a horizontally swingable gate 38 hinged at one side as at 39 and provided at its other side with keeper brackets 40 engaged by pivoted hooks 41 to latch the gate closed. Hooks 41 are connected for operation in unison by means of an operating bar 42 having a handle 43, and a spring 44 acts to yieldingly engage the hooks 41 with the keeper brackets 40. Gate 38 is of hollow construction and has an opening 45 to receive the animal's neck. A fixed neck rest 46 of padded construction is provided at the bottom of opening 45. A vertically swingable hand lever 47 is pivoted at one end as at 48 upon one end of a cross piece 49 fixed within the gate 38 and carrying the neck rest 46. Lever 47 has a curved portion 50 within the gate and a straight end portion 51 which projects outwardly through a slot 52 in the free side of gate 38. Pivoted at 53 near their lower ends to the cross piece 49 and arranged within the gate 38 at opposite sides of opening 45 are upwardly diverging neck clamping levers 54 whose upper ends are connected by a cable or cord 55 passing over a pulley 56 mounted within an upper corner of the gate above one of said levers 54. This one of levers 54 is engaged at its outer side by a roller 57 journaled on the curved portion 50 of lever 47. Springs 58 are connected to the lower ends of levers 54 to normally swing their upper portions apart, and a spring 59 is connected to hand lever 47 to normally elevate the latter. The arrangement is such that when hand lever 47 is swung downwardly, the neck of the animal is forced into neck rest 46, and levers 54 are swung toward each other to clamp against the sides of the animal's neck, roller 57 acting to swing one lever 54, and cord or cable 55 being pulled by said one lever 54 to swing the other lever 54. Suitable means is provided to latch the levers 47 and 54 in clamping position, which means includes a ratchet bar 60 pivoted near its lower end as at 61 to the free side of gate 38 and engaged with the end portion 51 of hand lever 47 by means of a spring 62. A cam lever 63 is carried by gate 38 and positioned to engage the lower end of ratchet bar 60 so that an upward pull on said cam lever will swing said ratchet bar to release hand lever 47. Cam lever 63 gravitates to inoperative position and may be pulled to effect release of lever 47 by means of a pull cord or cable 64 passing around a pulley 65 and attached at one end to said cam lever and at its other end to the outer end of lever 47.

A nose bar 66 has a downwardly bent end 67 which is pivotally engaged in a bracket 68 mounted on gate 38 below neck rest 46, and said nose bar has an offset portion 69 for engagement with the fleshy part of the animal's nose. The bracket 68 has two sets of openings at 70 for selective reception of the end 67 of the nose bar, whereby the latter may be mounted at different distances from the gate in accordance with the size of the animal's head. As will be apparent, the nose bar swings horizontally toward and from the gate, and it is held in nose-engaging position by a chain 71 attached by welding or the like to crate 5, and a slotted keeper lug 72 carried by the nose bar and adjustably engageable by said chain.

In using the stock, gate 38 is closed, side walls 7 are adjusted to proper spaced relation according to the size of the animal to be held, door 18 is opened by pulling cord or cable 20, the animal is driven onto floor 6 between the walls 7, walls 7 are swung against the sides of the animal's body, and door 18 is closed behind the animal. If branding or castrating is to be done, the desired portion of the side or quarters of the animal is exposed by releasing the necessary bar or bars 11 and swinging it or them to an out-of-the-way position. If dehorning is to be done, the nose bar 66 is adjusted to the desired position and secured in place against the animal's nose. In either case, the animal's head may be passed through the opening 45 of gate 38, and the animal's neck may be clamped in neck rest 46 by levers 47 and 54. After the desired operation has been performed, pawl 29 is released to allow the walls 7 to swing apart, lever 47 is released to allow it and levers 54 to release the animal's neck, and hooks 41 are released and gate 38 is swung open. The animal is then free to pass out of the stock so that the latter may again be used in the same way for the next animal. Obviously, when the doors 18 and 38 are closed the animal cannot back or move forwardly out of the stock. Also, when the animal's body is clamped between the walls 7, and its neck is clamped in opening 45 within neck rest 46 by levers 47 and 54, the animal is firmly held while the desired operation is being performed. Additional freedom of access to the animal may be had by removing the panels 10.

From the foregoing description, it is believed that the construction, operation and advantages of the present invention will be readily understood and appreciated by those skilled in the art. Modifications and changes in details of construction are contemplated, such as fairly fall within the spirit and scope of the invention as claimed.

Having described the invention, what is claimed as new is:

In a cattle stock, a crate comprising a main skeleton frame and having a central longitudinal floor secured at the bottom thereof, said floor comprising a series of holes spaced crosswise of said floor, side walls comprising a skeleton frame having top, side and bottom members, said side wall skeleton frame members being pivotally mounted on said floor, said side walls terminating in protruding pin means which is selectively engageable in said holes to provide for lateral adjustment of the side walls at the floor level, the lower sections of said side walls comprising fixed panels, a series of longitudinally spaced vertically extending bars pivotally attached to said lower panel sections and adapted to be swung outwardly and downwardly relative thereto, means for releasably securing the upper ends of said vertical bars to the top frame portions of said side walls, manually operable means connected to the uppermost frame portions of said side walls for swinging the same toward each other and into clamping position, a hollow horizontally swingable gate for closing one end of said crate, means to latch said gate in closed position, said gate having a neck opening and a neck rest at the bottom of said opening, a pair of neck clamping levers mounted within said gate at opposite sides of said neck opening, a vertically swingable hand lever having a portion within said gate and a portion projecting through a side thereof, said hand lever being depressible to force the subject's neck downwardly into said neck rest, a roller carried by said hand lever and engaging one lever of said pair of levers for swinging the latter to clamping position when said hand lever is depressed, a cable operably connecting said pair of levers whereby swinging of said one lever of said pair to clamping position will cause swinging of the other lever of said pair to clamping position, and means to latch said hand lever in depressed position.

ARCHIE E. SIMON.

REFERENCES CITED

The following references are of record in the file of this patent:

UNITED STATES PATENTS

| Number | Name | Date |
|---|---|---|
| 425,478 | Webster | Apr. 15, 1893 |
| 657,379 | Bakken | Sept. 4, 1900 |
| 821,454 | Bidwell | May 22, 1906 |
| 899,901 | Purcell et al. | Sept. 29, 1908 |
| 1,799,073 | Thompson | Mar. 31, 1931 |
| 1,805,405 | Kuhns | May 12, 1931 |
| 2,084,255 | Johnson | June 15, 1937 |
| 2,136,008 | Gregory | Nov. 8, 1938 |
| 2,139,710 | Yokum | Dec. 13, 1938 |
| 2,268,707 | Huckelbridge | Jan. 6, 1942 |
| 2,308,213 | Shearer | Jan. 12, 1943 |
| 2,396,928 | Parsons | Mar. 19, 1946 |
| 2,438,322 | McDonough | Mar. 23, 1948 |